(12) United States Patent
Fardeau et al.

(10) Patent No.: US 8,455,240 B2
(45) Date of Patent: Jun. 4, 2013

(54) USE OF THERMOPHILIC SULPHATE-REDUCING ARCHAEA FOR THE IMPLEMENTATION OF A PROCESS FOR THE DEGRADATION OF HYDROCARBONS

(75) Inventors: Marie-Laure Fardeau, Les Pennes Mirabeau (FR); Bernard Ollivier, Roquevaire (FR); Agnès Hirschler-Rea, Aubagne (FR); Nadia Khelifi, Ariana (TN)

(73) Assignee: Institut de Recherche pour le Development (I.R.D.), Paris Cedex (FR)

( * ) Notice: Subject to any disclaimer, the term of this patent is extended or adjusted under 35 U.S.C. 154(b) by 1405 days.

(21) Appl. No.: 11/993,971

(22) PCT Filed: Jun. 30, 2006

(86) PCT No.: PCT/FR2006/001541
§ 371 (c)(1),
(2), (4) Date: Feb. 20, 2008

(87) PCT Pub. No.: WO2007/003779
PCT Pub. Date: Jan. 11, 2007

(65) Prior Publication Data
US 2008/0206839 A1    Aug. 28, 2008

Related U.S. Application Data

(60) Provisional application No. 60/695,542, filed on Jul. 1, 2005.

(51) Int. Cl.
*A62D 3/00* (2007.01)
*A62D 3/02* (2007.01)
*B09B 3/00* (2006.01)
*B09C 1/10* (2006.01)
*C10G 32/00* (2006.01)
*C12N 1/12* (2006.01)
*C12N 1/20* (2006.01)

(52) U.S. Cl.
USPC ............ 435/282; 435/252.1; 435/262.5; 435/281; 435/822

(58) Field of Classification Search
None
See application file for complete search history.

(56) References Cited

U.S. PATENT DOCUMENTS

| 5,753,122 A * | 5/1998 | Taylor et al. ............... 210/611 |
| 6,488,850 B2 | 12/2002 | Perriello |
| 2003/0044966 A1 | 3/2003 | Perriello |
| 2005/0013759 A1 * | 1/2005 | Grow ............... 423/263 |

OTHER PUBLICATIONS

Vadas et al. "Identification and Characterization of a Novel Ferric Reductase from the Hyperhtermophilic Archaeon *Archaeoglobus fulgidus*", The J. of Bio. Chem. vol. 274, No. 56, pp. 36715-36721, Dec. 17, 1999.*

* cited by examiner

*Primary Examiner* — Debbie K Ware
(74) *Attorney, Agent, or Firm* — Young & Thompson

(57) ABSTRACT

The aim of the invention is to use sulphate-reducing thermophilic archaeobacteria for carrying out a method for degrading linear or branched, saturated or unsaturated, when necessary sulphur, aromatic hydrocarbons under anaerobic conditions.

14 Claims, No Drawings

USE OF THERMOPHILIC SULPHATE-REDUCING ARCHAEA FOR THE IMPLEMENTATION OF A PROCESS FOR THE DEGRADATION OF HYDROCARBONS

FIELD OF THE INVENTION

The present invention relates to the use of thermophilic sulphate-reducing archaeobacteria for the implementation of a process for the degradation of aliphatic or aromatic hydrocarbons under anaerobic conditions.

BACKGROUND OF THE INVENTION

Hydrocarbons are organic compounds constituted by carbon and hydrogen, one of their main reservoirs is petroleum, formed geochemically at high temperatures and high pressures. The hydrocarbons include saturated compounds; the alkanes and the cycloalkanes, unsaturated compounds; the alkenes and the cycloalkenes, and aromatic compounds which can be mono or polycyclic. In fact, the aliphatic and aromatic hydrocarbons constitute more than 75% of the majority of crude oils. It is even possible to note the presence of organic nitrogen-, sulphur- or oxygen-containing compounds at a low concentration, the presence of an asphaltic fraction and porphyrins (Bertrand and Mille, 1989).

Petroleum is the main source of energy used by man. Problems follow from this during its distribution. These are problems on the one hand due to transport and storage, the risks of biodegradation of the petroleum and its derivative products. Moreover, transport carried out essentially by sea route, plays a major role in the pollution of the environment. L'Academie Nationale des Sciences and de l'Environnement has estimated that the introduction of petroleum into the environment is 1.7 to 8.8 millions of metric tons, most of which are of anthropgenic origin (Leahy and Cowell, 1990).

The pollution of natural environments by hydrocarbons has become a significant preoccupation. In fact, oil bunkers contain sulphur-containing compounds, such as dibenzothiophene (DBT). Their combustion is the main cause of urban pollution and acid rain. Moreover, the microorganisms present in oil wells corrode steel and jeopardize the safety of operating agents by the production of sulphides in anaerobiosis; what is called "Souring of the deposits". Also, scientists are endeavouring to understand the mechanisms of chemical and biological degradation of hydrocarbons with a view to putting biotechnological processes in place in order to remedy this environmental problem. In fact, the biodegradation treatment, i.e. natural degradation accelerated by the microorganisms, is advantageous since it is less expensive and less harmful from an ecological point of view than the physicochemical treatments. It can, moreover lead to a complete mineralization of the hydrocarbons.

The catabolism of hydrocarbons has for a long time been considered as a process which is strictly dependent on oxygen. During this process, the initial stage requires the use of oxygenases (Spormann and Widdel, 2000) It has been possible to envisage the ability of a few bacteria to metabolize hydrocarbons in the absence of oxygen only for some twenty years (Atlas, 1981; Bertrand & Mille, 1989; Leahy & Colwell, 1990). The microorganisms capable of such metabolism must have found an alternative in order to degrade hydrocarbons in the absence of oxygen. Up to then, denitrifying bacteria, sulphate-reducing bacteria, and iron-reducing bacteria, capable of degrading hydrocarbons have been isolated.

It was in 1987 that Stetter et al. isolated a new group of sulphate-reducing and hyperthermophilic Archaea from a hydrothermal system on Vulcano Island in Italy (strain *Archaeoglobus fulgidus* VC 16 (DSM 4304)).

The species belonging to the genus *Archaeoglobus* are characterized by cells in the form of regular or irregular shells, having a size varying from 0.4 to 1 µm. These are Gram negative, separated or in pairs. These microorganisms tolerate a growth temperature ranging from 60° C. to 95° C., a pH of the order of 5.5-7.5. This are chemoorganotrophs which can oxidize formate, formamide, D– and D+ lactate, glucose, starch, casamino acids, peptone, gelatin, caseine, yeast extract, meat extract and extracts of eubacteria and of archaea cells, in the presence of sulphate, thiosulphate and sulphite as electron acceptors. Moreover, these microorganisms can grow in the presence of $H_2CO_2$. In the presence of thiosulphate as an electron acceptor, there is production of sulphides greater than 6 µmol/ml and methane traces of less than 0.1 µmol/ml.

*Archaeoglobus fulgidus* VC-16 is the typical species; the cells are presented in the form of irregular spheres with an envelope composed of glycoproteins. This strain has an optimum growth temperature equal to 83° C. and a generation time of approximately 4 hours.

This species is filed in the German collection of microorganisms at Braunschweig-Stockheim, referred to as VC-16 (4304).

Klenk et al. (1997) carried out the sequencing of the genome of *a. fulgidus,* VC-16 while comparing it with an Archaea: *Methanococcus jannaschii*. In fact, *A. fulgidus* is the first sulphate-reducing Archaea to have its genome sequenced. The genome of *A. fulgidus* is a circular chromosome formed by 2,178,400 base pairs, with a G+C composition of the DNA equal to 48.5%.

Sulphate-reduction is the most abundant respiratory process in anoxic marine environments. Sulphate $(SO_4^{2-})$ is first to be activated in order to produce Adenylsulphate (Adenosine-5'-phosphosulphate; APS) followed by sulphite. The enzyme involved in the dissimilatory sulphate-reduction process is adenylsulphate reductase which reduces the activated sulphate. The sulphite, thus formed, is reduced to sulphide by the action of a desulphoviridin, sulphite reductase.

Although it has been pointed out that *A. fulgidus* is incapable of growing on acetate, several acetyl-CoA synthetase genes have been detected in its genome, They are responsible for the conversion of acetate to acetyl-CoA. The presence of 57 enzymes involved in the β-oxidation suggests that *A. fulgidus* is capable of oxidizing the fatty acids. The β-oxidation route in Archaea is similar to that: talking place in the Bacteria and mitochondria.

In *A. fulgidus*, the production of traces of methane during growth is probably due to a reduction of N5-methyltetrahydromethanopterin via carbon monoxide dehydrogenase. Moreover, it has been suggested that *A. fulgidus* contains a type of CO dehydrogenase similar to that of *Rhodospirillum rubrum* allowing it to grow by using carbon monoxide as sole source of energy.

SUMMARY OF THE INVENTION

The purpose of the present invention is to provide novel processes for the degradation of aliphatic or aromatic hydrocarbons, under anaerobic conditions, as well as novel bacterial strains for the implementation of these processes.

The invention relates to the use of thermophilic sulphate-reducing archaeobacteria for the implementation of a process for the degradation, under anaerobic conditions, of saturated or unsaturated, linear or branched, aliphatic hydrocarbons, or of aromatic hydrocarbons, sulphur-containing if appropriate.

The invention relates more particularly to the abovementioned use, in which the archaeobacteria are chosen from the species belonging to the genus *Archaeoglobus*, and in particular from the following species:
- *Archaeoglobus fulgidus*,
- *Archaeoglobus profondus*,
- *Archaeoglobus veneficus*.

A more particular subject of the invention is the abovementioned use, in which the archaeobacteria are chosen from the following *Archaeoglobus fulgidus*:
- *Archaeoglobus fulgidus* DSM 4304,
- *Archaeoglobus fulgidus* CNCM I-3465 deposited on 22 Jun. 2005 (strain L3),
- *Archaeoglobus fulgidus* CNCM I-3469 deposited on 30 Jun. 2005 (strain L4).

DETAILED DESCRIPTION OF THE INVENTION

The invention relates more particularly to the abovementioned use, in which the hydrocarbons are chosen from:
- the alkanes, and in particular the branched alkanes the linear chain of which comprises 5 to 20 carbon atoms, in particular heptamethylnonane (HMN) or prystane,
- the alkenes, and in particular the linear alkenes the chain of which comprises 1 to 20, in particular 1 to 16 carbon atoms,
- the aromatic compounds and in particular dibenzothiophene (DBT), benzene), toluene, naphthalene or phenanthrene.

A more particular subject of the invention is the abovementioned use, in which the sulphate or the thiosulphate is used as an electron acceptor, the (saturated or unsaturated, branched or linear) aliphatic and aromatic hydrocarbons are used as electron donor, and the production of $H_2S$ in the presence of hydrocarbons is greater than or equal to approximately 1 mM, and in particular approximately 4 mM.

The invention also relates to a process for the degradation, under anaerobic conditions, of saturated or unsaturated, linear or branched, aliphatic hydrocarbons, or of aromatic hydrocarbons, if appropriate sulphur-containing, characterized in that it comprises a stage of placing said hydrocarbons in the presence of thermophilic sulphate-reducing archaeobacteria as defined above, if appropriate after addition to the reaction medium of sulphate or thiosulphate used as an electron acceptor, and of said hydrocarbons used as electron donors.

The invention relates more particularly to a process as defined above, characterized in that the archaeobacteria are chosen from the species belonging to the genus *Archaeoglobus*, and in particular from the following species:
- *Archaeoglobus fulgidus*,
- *Archaeoglobus profondus*,
- *Archaeoglobus veneficus*.

A more particular subject of the invention is a process as defined above, characterized in that the archaeobacteria are chosen from the following *Archaeoglobus fulgidus*:
- *Archaeoglobus fulgidus* DSM 4304,
- *Archaeoglobus fulgidus* CNCM I-3465 deposited on 22 Jun. 2005 (strain L3),
- *Archaeoglobus fulgidus* CNCM I-3469 deposited on 30 Jun. 2005 (strain L4).

The invention relates more particularly to a process as defined above, characterized in that the hydrocarbons are chosen from:
- the alkanes, and in particular the branched alkanes the linear chain of which comprises 5 to 20 carbon atoms, in particular heptamethylnonane (HMN) or prystane,
- the alkenes, and in particular the linear alkenes the chain of which comprises 1 to 20, in particular 1 to 16 carbon atoms,
- the aromatic compounds and in particular dibenzothiophene (DBT), benzene), toluene, naphthalene or phenanthrene.

A more particular subject of the invention is a process as defined above, characterized in that the production of $H_2S$ in the presence of hydrocarbons is greater than or equal to approximately 1 mM, and in particular approximately 4 mM.

The invention relates more particularly to a process as defined above, characterized in that the quantity of archaeobacteria used is approximately 1 g/L (wet weight) for approximately 2 mM of hydrocarbons.

A more particular subject of the invention is a process as defined above, characterized in that the contact time between the archaeobacteria and the hydrocarbons is approximately 15 days.

The invention relates more particularly to a process as defined above, characterized in that it comprises a stage of recovery of the cells, and if appropriate of purification of membrane lipids.

The invention also relates to the archaeobacteria chosen from the Following species belonging to the genus *Archaeoglobus*:
- *Archaeoglobus fulgidus* CNCM I-3465 deposited on 22 Jun. 2005 (strain L3),
- *Archaeoglobus fulgidus* CNCM I-3469 deposited on 30 Jun. 2005 (strain L4).

The invention is further illustrated using the detailed description which follows of the utilization of strains of archaeobacteria within the framework of the degradation of hydrocarbons.

Materials and Methods

I. The Strains Used

Throughout the Experimental Study Which Follows, by "*Archaeoglobus fulgidus*" is Meant the Strain DSM 4304, and by "Strain L-3" the Strain CNCM I-3465 Deposited on 22 Jun. 2005 at the CNCM (Paris). the Experimental Results Obtained with the Strain L-3 can also be Obtained with the Strain L-4, I.E. the Strain CNCM I-3469 Deposited on 30 Jun. 2005 at the CNCM (Paris).

*Archaeoglobus fulgidus* (DSM 4304) is an extremely thermophilic, strictly anaerobic sulphate-reducing Archaea. It has been isolated from a marine hydrothermal system (Vulcano Island) near Naples (Stetter, 1988). The cells have a coccoid shape, a size of 0.4 to 1 μm and are separated or in pairs. In order to obtain optimum growth, the temperature must be 83° C., the pH comprised between 5.5 and 7.5 and the optimum substrate is lactate. The G+C percentage of the DNA of this strain is 46%.

The strain L-3 is an Archaeon which was isolated from a sample taken at 80° C. from a geothermal well situated at Melun (Paris region) by M. L. Fardeau. The cells are shells 1 to 1.5 μm in diameter. This strain is capable of growing at temperatures ranging from 55 to 85° C., its optimum temperature being 75° C. It grows at a pH equal to 6.5.

The strain L-3 is a sulphate-reducing strain the growth of which is favoured by thiosulphate as electron acceptor instead of sulphate, and lactate as substrate. During its metabolism, the substrates used are totally oxidized in order to produce the formation of $CO_2$, unlike *Archaeoglobus fulgidus* (DSM 4304) the oxidation of which is partial and passes traces of acetate through excretion.

A phylogenetic characterization has shown that 99% similarity exists between the DNA sequences coding for the RNA 16S of the strain L-3 and *Archaeoglobus fulgidus* (DSM 4304). From genomic point of view, the strain L-3 hybridizes approximately 90% (DNA/DNA hybridization) with *A. fulgidus* (DSM 4304).

II. Microbiological Methods

II.1. Anaerobic Culture Media

The culture media were prepared according to the techniques worked out by Hungate (1969) and developed by Miller and Wollin (1974). The synthetic medium is composed, per 1 liter of distilled water, of $NH_4Cl$, 1 g; $KH_2PO_4$, 0.3 g; $K_2HPO_4$, 0.3 g; KCl, 0.1 g; $CaCl_2$, $2H_2O$, 0.1 g; NaCl, 20 g; $NiSO_4.6H_2O$, 1.6 mg; $Na_2WO_4.2H_2O$, 38 μg; $Na_2SeO_3.5H_2O$, 3 μg; Yeast extract, 0.1 g; thiosulphate or sulphate, 20 mM, according to the experiment; L-Cysteine, HCl hydrochloride, 0.5 g; resazurin, 1 ml of a 0.1% solution; 0.05 ml of a vitamin solution (Wollin et al., 1963); trace elements, 1 ml. This solution of trace elements contains, per 1 liter of distilled water, 10 ml of 25% HCl, 1.5 g of $FeCl_2$, $4H_2O$, 190 mg of $CoCl_2$, $6H_2O$, 100 mg of $MnCl_2$, $4H_2O$, 70 mg of $ZnCl_2$, 62 mg of $H3BO_3$, 36 mg of $Na_2MoO_4$, $2H_2O$, 24 mg of $NiCl_2$, $6H_2O$, 17 mg of $CuCl_2$, $2H_2O$, and its pH is adjusted to 7.2.

The pH of the medium is adjusted to 7, then the medium is taken to boiling under a nitrogen flow in order to degas the medium and replace the dissolved oxygen with nitrogen. The anoxic culture medium is distributed according to usage either into culture flasks, or into anaerobic culture tubes.

After sterilization of the culture medium in an autoclave for 45 minutes at 121.1° C., the latter is completed by the addition of $Na_2S$, $9H_2O$, 2% (0.1 ml for 5 ml) as reducing agent, $NaHCO_3$, 10% (0.1 ml for 5 ml) as buffer, and $MgCl_2$, $6H_2O$ (3 g/L). The latter is added after sterilization in order to avoid its precipitation linked to the presence of NaCl.

Finally, the substrate is added according to the conditions of the experiment. When it is lactate, the latter is introduced at 20 mM from a sterile 1 M solution.

III. Chemical and Biochemical Analyses

III.1. Sulphide Assay

The sulphide assay was carried out according to two methods, that of Cord-Ruwish (1985) and that of Cline (1969).

III.1.1. Sulphide Assay According to Cord-Ruwish

The sulphide assay according to Cord-Ruwish is a turbidimetric assay.

Experimentally, 4 ml of Cord-Ruwish reagent comprising 50 mmol/l of HCl and 5 mmol/l of $CuSO_4$ are added to 0.1 ml of sample. Copper sulphate ($CuSO_4$) by reacting with hydrogen sulphide ($H_2S$), forms a copper sulphide precipitate (CuS) after the reaction:

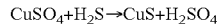

$$CuSO_4 + H_2S \rightarrow CuS + H_2SO_4$$

According to this method, the CuS is assayed by spectrophotometry at 480 nm. The readings are carried out against a blank constituted by 4 ml of Cord-Ruwish reagent.

The quantity of sulphide is calculated with respect to a standardization curve produced with sodium sulphide.

III1.2. Sulphide Assay According to Cline

The sulphide assay according to Cline's method is a calorimetric assay. This assay is based on the formation of methylene blue following the combination of 2 molecules of dimethyl p-phenylene diamine (DMPD) in the presence of ferric chloride by a sulphide bridge.

A micromethod was used, carried out on a fraction of 1 to 20 μl of sample placed in 2% zinc acetate which will fix the sulphide in the form of insoluble zinc sulphide (qsf 500 μl).

200 μl of 0.2% DMPD (2 g of dimethylaniline sulphate, 200 ml of concentrated sulphuric acid, distilled water qsf 1 l), 10 μl of 10% iron chloride and 200 μl of distilled water are then added. The intensity of the colouring is measured with a spectrophotometer at 670 nm, against a blank containing water instead of the sample. The sulphide concentration is determined by comparison with a standardization curve produced from a sodium sulphide solution.

III.2. Analyses and Quantification of the Metabolism Products

III.2.1. Description

The analysis and quantification of the metabolites are carried out by HPLC by measuring the disappearance of the substrate and the appearance of different metabolism products.

The apparatus used is constituted by:
An Aminex HPX-87H 300×7 column, 8 mm (Biorad) taken to 35° C.;
A Spectra Series AS 100 type automatic sampler processor;
A Spectra System RI 150 type differential refractometer detector;
A Spectra system SCM1000 automatic degasser coupled to the injector;
A computer where the results are recorded, integrated and analyzed by Azur Datalys software.

Reference standardization curves are established with solutions of known concentrations which allow the software to identify a compound by its retention time and to deduce its concentration from this. The peaks identified are processed automatically and the concentration of each compound is deduced from the size of the peak.

II.2.2. Operating Method

The liquid eluent is filtered and degassed sulphuric acid (0.0025 M) at 35° C. The flow rate of the eluent is 0.6 ml/min with a pressure of 1200 Psi. The liquid for rinsing the injection syringe is water.

The samples are taken and frozen before passing through HPLC. After thawing, the samples are centrifuged for 6 min at 13000 rpm at 20° C.

600 μl of supernatant is introduced into suitable small flasks which are then placed in the automatic sampler processor. The injection volume is 20 μl. At the end of each analysis series, the column is rinsed with a 15% acetonitrile solution in order to avoid any bacterial contamination of the column which could distort the measurements.

III.3. Thiosulphate and Sulphate Assay

II.3.1. Description

The thiosulphate and sulphate assays are carried out by ion chromatography.

Ion chromatography (IC) is one of the oldest chromatographic techniques. Paradoxically, automatic ion chromatography apparatuses were developed only slightly more than twenty years ago (1975).

The principle of ion chromatography is based on an ion exchange on resin. The ions are entrained by a mobile phase and separated by the action of the stationary phase. Depending on whether the electrostatic interaction between the resin in the column and the ions to be separated is more or less strong, the separation will be carried out more or less easily.

The analyses are carried out with a chromatograph (Compact IC 761, Metrohm) equipped with:
A cationic ion-exchange column (Metrosep A SUPP 1-250 (6.1005.300)), size 4.6*250 mm;
The eluent used is $Na_2CO_3$ at a concentration of 3 mmol/l, at a flow rate of 1 to 2.5 ml/min; ((→the flow rate varies during the analysis))
A sample processor (Metrohm 838);
A conductimeter;
A computer where the results are recorded, integrated and analyzed by software (761 Compact IC, Metrohm).

III.3.2. Operating Method

The operating conditions are such that the temperature is 20° C. and the pressure is 5 MPa. The samples to be analyzed are filtered. The injection volume is 20 µl. The detection is of conductimetric electrochemical type with chemical suppression allowing elution gradients.

III.4. Analyses by Gas Chromatography(GC)

Gas chromatography is a transposition of liquid chromatography in which the mobile liquid phase has been replaced by a gas.

A gas chromatograph comprises:
- A column, arranged in a thermostatically-controlled oven;
- A sample injection device;
- A detector.

III.4.1. $CO_2$ Assay

III.4.1.1. Description

The GC equipped with a katharometer is used to qualify and quantify the hydrogen, oxygen and $CO_2$ consumption levels. The different gaseous solutes will be separated by differential migration along the stationary phase. The retention times of these gases in the column are different, which makes it possible to separate them by increasing order of molecular weights and to identify them; the H2 is eluted first, then the $O_2$ and finally the $CO_2$.

The analyses are carried out with a Shimadzu GC-8A chromatograph equipped with:
- a column filled with a carbosphere support, maintained at 150° C.;
- an injector and a detector (katharometer) maintained at a temperature of 200° C.,
- a reference cell through which only the carrier gas $N_2$ passes;
- a measurement cell through the carrier gas and the sample pass; this is the potential difference created between the two cells by variation of their resistance which makes it possible to quantify the effluents.

The result provided by the device appears in the form of peaks. According to pre-established standardization curves with known concentrations of pure gases, each peak is allocated to the corresponding compound.

III.4.1.2. Operating Method

The $CO_2$ assay is carried out after displacement of the $CO_2$ present in the liquid phase towards the gas phase. The release of the $CO_2$ into the gas phase is due to the addition of a volume of 1 M phosphoric acid equal to 1% of the volume of the culture, followed by vigorous stirring. 0.1 ml of the gas phase is injected into the chromatograph.

III.4.2. Assay of the Heavy Hydrocarbons

III.4.2.1. Description

The assay of the heavy hydrocarbons is carried out by injection of extracted hydrocarbons into a gas chromatograph. The chromatograph used is of Chrompack CP 9000 type, equipped with:
- A semi-capillary column (Chrompack) with fused silica (10 m*0.53 mm) containing a stationary phase of CP-Sil 5 CB type (1 µm thick); its temperature is 80° C. and increasing to 180° C., at a rate of 2° C./min;
- A carrier gas, nitrogen with a flow rate of 10 ml/min;
- A flame ionization detector maintained at 300° C.;
- An injector maintained at 300° C.

III.4.2.2. Principle

The heavy hydrocarbons are assayed by gas chromatography (GC) after extraction from the cultures with a half-volume of heptane, with an internal standard added. Three injections of 1 µl are carried out per sample. A standardization curve is produced using increasing [hydrocarbon to be assayed]/[internal standard] ratios.

III.4.2.3. Operating Method of the Study the Degradation of a Hydrocarbon

The culture medium is completed as presented in paragraph 1.2, without substrate, and distributed into Bellco tubes. The tests are inoculated at 10%. The aliphatic hydrocarbons (alkanes and alkenes) are introduced directly into the tubes at a rate of approximately 2 mM. The other hydrocarbons to be assayed (dibenzothiophene (DBT) are dissolved in heptamethylnonane (HMN) and HMN alone). The hydrocarbons are introduced using a chromatography syringe (Hamilton) after removing the blue stoppers and placing the tubes under a nitrogen flow. This operation subsequently makes it possible to replace the blue stoppers (Bellco) by Teflon-coated blue stoppers. Finally, the tubes, placed upside down, are incubated at 75° C.

The initial concentration of the HMN introduced, as substrate, is 1 mM (HMN, MM=226.45; d=0.793) and that of the DBT is 5.4 mM (taking for the calculation 10 mg/10 ml tube; MW=184.26).

Two types of controls are prepared; in the first type, the hydrocarbons have been introduced but not the inoculum, whereas the second type has been inoculated but the hydrocarbons have not been introduced.

The quantitative analysis of the degradation of these hydrocarbons is carried out on tests and controls sacrificed at the initial time and at the final time of the experiment.

The extraction of the hydrocarbons was carried out by a half-volume of heptane containing an internal standard. The internal standards were chosen; in the case of the quantitative study of the degradation of the DBT, pristane was chosen (45 µl/25 ml of heptane), on the other hand, for the HMN, the internal standard is tetradecane (20 µl/25 ml of heptane).

III.5. Cell Count

The cell count is the determination of the number of cells contained in a precise volume of a liquid medium. The result of the count is expressed as cell concentration, i.e. in the number of cells per liter.

The cell count adopted during the experiments is carried out either directly by counting with a microscope, using a special counting slide (or counting chamber), or indirectly by measurement of the absorbance at 580 nm.

III.5.1. Principle of the Cell Count

A counting chamber is an object slide in which a counting chamber of known volume is hollowed out. This is a thick glass slide, comprising grooves and a grid.

It should be pointed out that the counting volume is determined by the area of the grid engraved on the slide and the depth of the chamber.

III.5.2. Thoma cell: Description and Principle

The Thoma cell is a glass slide comprising a delimited area with a grid of 400 squares, which, covered with a flat slide, traps a known volume of microbial suspension.

In order to carry out a cell count, the following procedure is followed: The two side plates of the cell are dampened such that the slide adheres perfectly to the side plates. The counting chamber is then filled by capillarity with the homogeneous cell suspension avoiding creating air bubbles. The count can be carried out after a few minutes when the cells will be deposited onto the grid.

The count is carried out with a×40 lens over 3 to 4 large squares. The cell concentration of the studied suspension is: $N=n/v$ with:
- n: number of cells counted,
- v: counting volume, knowing that each large square has a volume of $4.10^{-6}$ ml,
- N: number of cells per liter.

Results

I. Physiological Characterization of the Strain L-3 and *Archaeoglobus fulgidus*

I.1. Requirement of Strain L-3 for Yeast Extract

In order to study the requirement of strain L-3 for yeast extract, tests and controls were prepared in duplicate. In the tests containing the lactate substrate, variable quantities of yeast extract were added, on the other hand, the controls contain 2 g/l of yeast extract and no substrate; this is illustrated by Table 1.

Monitoring of the microbial growth was carried out by measurements of the OD at 580 nm and the microbial activity was monitored by the production of sulphide according to the Cord-Ruwish method.

It is also possible to grow the strain L-3 without yeast extract on the following medium composed, for 1 liter of distilled water, of $NH_4Cl$, 1 g; $KH_2PO_4$, 0.3 g; $K_2HPO_4$, 0.3 g; KCl, 0.1 g; $CaCl_2$, $2H_2O$, 0.1 g; NaCl, 20 g; $NiSO_4.6H_2O$, 1.6 mg; $Na_2WO_{4.2}H_2O$, 38 µg; $Na_2SeO_3.5H_2O$, 3 µg.

As regards the controls, without substrate, and containing 2 g/l of yeast extract no increase in the cell biomass or in sulphide production is observed throughout the incubation period. This demonstrates that the strain L-3 is not capable of developing on 2 g/l of yeast extract as the sole source of carbon and energy.

In the tests with 0 g/l of yeast extract, there is no cell growth. This result is confirmed by sulphide values not exceeding 0.5 mM. Thus, the strain L-3 requires yeast extract in order to grow.

In the tests, with variable quantities of yeast extract (0.1; 0.5; 1 and 2 g/l), an increase is noted in the values of the cell biomass produced, accompanied by sulphide production; however, this cell growth varies as a function of the quantity of yeast extract added. In fact, the test with 2 g/l is characterized by the highest cell biomass and sulphide production values, relative to the other tests, and which are respectively, on average, 0.1968 for the OD at 580 nm and 2.8 mM of sulphide.

Thus, the sequence of experiments is carried out with media containing 2 g/l of yeast extract.

TABLEAU 1

Requirement of strain L-3 for yeast extract

| | Yeast extract(g/l) | Absorbance 580 nm initial | final | $H_2S$ (mM) |
|---|---|---|---|---|
| Test | 0 | 0.0754 | 0.0864 | 0.5 |
| | | 0.1094 | 0.1052 | 1.3 |
| Test | 0.1 | 0.0636 | 0.0946 | 0.7 |
| | | 0.0718 | 0.1176 | 1.3 |
| Test | 0.5 | 0.0761 | 0.1415 | 0.7 |
| | | 0.1099 | 0.1671 | 0.3 |
| Test | 1 | 0.0998 | 0.1671 | 1.1 |
| | | 0.0805 | 0.1475 | 2.8 |
| Test | 2 | 0.0928 | 0.1965 | 0.7 |
| | | 0.0998 | 0.1972 | 2.3 |
| Control without lactate | 2 | 0.0751 | 0.0737 | 0.2 |
| | | 0.0997 | 0.1066 | 0.2 |

I.2. Degradation of Substrates as a Function of the Electron Acceptor (Thiosulphate, Sulphate)

The study of the degradation abilities of different substrates of the strain L-3 was based on a comparison with the collection strain, *Archaeoglobus fulgidus* (DSM 4304). The degradation of the substrates, by the two strains was monitored by a measurement of the cell biomass at 580 nm, a sulphide assay produced according to the Cord-Ruwish method, a study of the degradation metabolites by HPLC, completed by a $CO_2$ assay with a GPC-Katharometer. The results are shown in Tables 2 and 3.

Two series of tests were prepared, one with thiosulphate, the other with sulphate as an electron acceptor.

In the tests where the substrate is lactate and the electron acceptor is thiosulphate or sulphate, an increase in microbial growth and a production of sulphide were observed. By HPLC, the degradation of the lactate, which was accompanied by a formation of traces of acetate was confirmed.

By comparing the two series of tests containing lactate as a function of the electron acceptors, and on the basis of the HPLC results, there is, with thiosulphate, a much greater formation of traces of acetate than with sulphate.

For the tests containing fumarate, using HPLC, it is not possible to locate the acetate peak in the case of degradation, as the two peaks (acetate and fumarate) appear at the same level. Nevertheless, a degradation of substrate is seen, accompanied by a production of sulphide, which in the case of thiosulphate reaches 6.5 mM, and in the case of sulphate does not exceed 3.1 mM. Thus, the mineralization of the fumarate is of much greater interest with thiosulphate than with sulphate as an electron acceptor, for *Archaeoglobus fulgidus*.

As regards pyruvate and formate, chemically, their degradation does not lead to a formation of acetate. Using HPLC, a disappearance of these substrates is observed. The degradation of the substrates was confirmed by a production of $CO_2$. The oxidation of the pyruvate is more effective in the presence of thiosulphate. That of the formate is equivalent for the two electron acceptors.

For the strain L-3, the lactate was metabolized with the two electron acceptors, but this mineralization confirmed by HPLC, is much greater with thiosulphate than with sulphate. Moreover, the results of the HPLC analysis show that no metabolites are produced during this degradation. It can therefore be assumed that the mineralization route of the substrates leads directly to the formation of $CO_2$.

As regards the tests containing pyruvate and fumarate, the HPLC analyses showed a degradation of the substrates which is confirmed by a production of $CO_2$.

Unlike *Archaeoglobus fulgidus*, the strain L-3 does not develop on the tests containing formate; this was proved by HPLC.

To conclude, *Archaeoglobus fulgidus* is capable of oxidizing lactate, fumarate, pyruvate and formate with a preference for thiosulphate over sulphate as an electron acceptor; its catabolism is characterized by a formation of traces of acetate. On the other hand, the strain L-3 is capable of degrading lactate, pyruvate, $H_2/CO_2$ and fumarate; this mineralization is much greater in the presence of thiosulphate than in the presence of sulphate (demonstrated by HPLC). Moreover, this mineralization is total, i.e. that it leads to $CO_2$.

TABLE 2

Degradation of different substrates by *A. fulgidus* as a function of the electron acceptor

| | Thiosulphate | | | | Sulphate | | | |
|---|---|---|---|---|---|---|---|---|
| | initial OD 580 | final OD 580 | total $H_2S$ | HPLC | initial OD 580 | final OD 580 | total $H_2S$ | HPLC |
| Lactate | 0.1333 | 0.3681 | 8 | (+) | 0.1657 | 0.4218 | 7.1 | (+) |
| | 0.1419 | 0.314 | 9.3 | | 0.1456 | 0.1199 | 12.2 | |
| Fumarate | 0.1085 | 0.1399 | 5.1 | (+) | 0.0759 | 0.1122 | 2.4 | (+) |
| | 0.117 | 0.1535 | 6.5 | | 0.085 | 0.14 | 3.1 | |
| pyruvate | 0.1368 | 0.3668 | 4.1 | (+) | 0.1281 | 0.1643 | 10.3 | (+) |
| | 0.1351 | 0.3489 | 9.9 | | 0.1377 | 0.1575 | 7.3 | |
| Formate | 0.1107 | 0.1218 | 5.8 | (+) | 0.0805 | 0.1 | 3.6 | (+) |
| | 0.1183 | 0.1208 | 7.4 | | 0.0853 | 0.1157 | 5 | |

TABLE 3

Degradation of different substrates by the strain L-3, as a function of the electron acceptor

| | Thiosulphate | | | | Sulphate | | | |
|---|---|---|---|---|---|---|---|---|
| | initial OD 580 | final OD 580 | total $H_2S$ | HPLC | initial OD 580 | final OD 580 | total $H_2S$ | HPLC |
| Lactate | 0.073 | 0.1027 | 9.3 | (+) | 0.1024 | 0.3076 | 2.8 | (+) |
| | 0.1029 | 0.1161 | 7.2 | | 0.0888 | 0.2071 | 1.4 | |
| Fumarate | 0.1083 | 0.1431 | 3.2 | (+) | 0.0606 | 0.1085 | 2.5 | (+) |
| | 0.0796 | 0.1137 | 2.5 | | 0.062 | 0.0899 | 3.3 | |
| Pyruvate | 0.0785 | 0.1161 | 4 | (+) | 0.0603 | 0.0958 | 3.5 | (+) |
| | 0.0911 | 0.0863 | 4 | | 0.0636 | 0.0944 | 3.3 | |
| Formate | 0.1003 | 0.1048 | 3.6 | (−) | 0.0585 | 0.0711 | 2.5 | (−) |
| | 0.1241 | 0.1186 | 2.8 | | 0.0634 | 0.064 | 5 | |

I.3. Sources of Carbon and Energy Used by the Strain L-3

The study of the growth of the strain L-3 in the presence of different sources of carbon and energy was carried out with thiosulphate as an electron acceptor. The monitoring was carried out by estimation of the cell biomass (OD 580 nm), by assay of the sulphide production (Cord-Ruwish). The results were confirmed by HPLC analyses, and completed in certain cases by a $CO_2$ assay. All of these results are shown in Table 4. Controls not containing substrates were produced; the strain L-3 did not develop in this control, i.e. that it did not develop on 2 g/l of yeast extract as sole source of carbon and of energy.

Compared with the controls (inoculated or not inoculated), the tests containing lactate, pyruvate and $H_2/CO_2$ show a cell growth accompanied by a sulphide production which reaches 5.7 mM, 5.2 mM, and 3.4 mM for lactate, pyruvate and $H_2/CO_2$ respectively. The hypothesis regarding the degradation of these substrates was confirmed by HPLC analyses.

It should be pointed out that in certain cases, the HPLC analyses show a reduction in the initial quantity of the substrate, as in the case of the tests containing glucose, fructose, mannose and ribose. But, this does not mean that there is mineralization of the substrates to the extent that there is no increase in the cell biomass and a production of sulphide. In fact, the reduction of a substrate, according to HPLC, can be explained by the phenomenon of isomerization caused by a high operating temperature.

TABLEAU 4

Sources of carbon and energy used by the strain L-3

| | OD 580 nm | | $H_2S$ | |
|---|---|---|---|---|
| | Initial | Final | (480 nm) | HPLC |
| Control not inoculated | 0.0807 | 0.0579 | 0.4 | (−) |
| | 0.068 | 0.0621 | 0.2 | |
| Control Inoculated | 0.0678 | 0.0756 | 0.3 | (−) |
| | 0.065 | 0.0632 | 0.2 | |
| Acetate | 0.0671 | 0.0904 | 0.4 | (−) |
| | 0.0771 | 0.0812 | 0.3 | |
| Formate | 0.0765 | 0.0672 | 0.2 | (−) |
| | 0.0875 | 0.0759 | 0.4 | |
| Lactate | 0.0742 | 0.1249 | 5.7 | (+) |
| | 0.0841 | 0.1173 | 2.9 | |
| Fructose | 0.0663 | 0.1003 | 0.3 | (−) |
| | 0.0818 | 0.0893 | 0.3 | |
| Glucose | 0.0665 | 0.0855 | 0.3 | (−) |
| | 0.0637 | 0.0801 | 0.3 | |
| Mannose | 0.0788 | 0.0731 | 0.3 | (−) |
| | 0.0723 | 0.0757 | 0.3 | |
| Propionate | 0.0669 | 0.0871 | 0.3 | (−) |
| | 0.0717 | 0.072 | 0.3 | |
| Pyruvate | 0.067 | 0.1315 | 2 | (+) |
| | 0.0713 | 0.1758 | 5.2 | |
| Succinate | 0.0845 | 0.0659 | 0.3 | (−) |
| | 0.0791 | 0.0672 | 0.3 | |
| Starch | 0.8834 | 0.069 | 0.8 | (−) |
| | 0.8614 | 0.603 | 0.7 | |
| Ribose | 0.2715 | 0.3422 | 0.6 | (−) |
| | 0.0915 | 0.21 | 0.5 | |

TABLEAU 4-continued

Sources of carbon and energy used by the strain L-3

|  | OD 580 nm | | $H_2S$ | |
|---|---|---|---|---|
|  | Initial | Final | (480 nm) | HPLC |
| Gelatin | 0.0629 | 0.0743 | 0.3 | (−) |
|  | 0.0894 | 0.0767 | 0.2 |  |
| Casamino Acid | 0.0837 | 0.0721 | 0.5 | (−) |
|  | 0.0793 | 0.0821 | 0.2 |  |
| Peptone | 0.0824 | 0.0785 | 0.2 | (−) |
|  | 0.0773 | 0.0592 | 0.3 |  |
| $H_2/CO_2$ | 0.0627 | 0.112 | 3.4 | (+) |
|  | 0.071 | 0.109 | 2.8 |  |

I.4. Abilities to Use Longer-chain Fatty Acids

The study of the use of fatty acids as a source of carbon and energy was undertaken for the two strains, the strain L-3 and the strain of *Archaeoglobus fulgidus* DSM 4304, with longer-chain fatty acids (FA) (than C1 FA formate, C2 FA acetate, C3 FA propionate). Monitoring of thiosulphate during the degradation of fatty acids by *A. fulgidus* and by L-3

*A. fulgidus*

| time 0 | mM thiosulphate | | | mM thiosulphate | |
|---|---|---|---|---|---|
| (Jul. 4, 2005) | E1 | E2 | end of May 2005 | E1 | E2 |
| T+ (lactate) |  |  | T+ (lactate) |  |  |
| butyrate (5 mM) |  | 12.51 | C4 fatty acid* | 9.29 |  |
| valerate (5 mM) |  |  | C5 fatty acid | 11.86 | 9.39 |
| octanoate (2 mM) |  |  | C8 fatty acid | 8.2 | 9.27 |
| nonanoate (2 mM) |  |  | C9 fatty acid | 7.65 | 10.52 |
| palmitate (2 mM) | 11.54 |  | C16 fatty acid |  | 9.12 |
| stearate (2 mM) |  |  | C18 fatty acid | 10.55 | 7.05 | strain L-3

| time 0 | mM thiosulphate | | | mM thiosulphate | |
|---|---|---|---|---|---|
| (Feb. 5, 2005) | E1 | E2 | end of May 2005 | E1 | E2 |
| T+ (lactate) |  |  | T+ (lactate) |  |  |
| butyrate |  | 15.45 | C4 fatty acid |  |  |
| valerate | 13.95* |  | C5 fatty acid |  |  |
| octanoate |  |  | C8 fatty acid | 9.56 and 9.33 |  |
| nonanoate |  |  | C9 fatty acid |  |  |
| palmitate |  | 15.52 | C16 fatty acid |  |  |
| stearate | 14.64* |  | C18 fatty acid |  |  |

*there remains approximately half of the butyrate and presence of traces of acetate (HPLC) The use of the C4 to C18 fatty acids tested allows growth of the collection strain. In fact, the electron acceptor concentration (thiosulphate) reduces.

I.4. Growth Kinetics of the Strain L-3 and of *Archaeoglobus fulgidus*,

I.4.1. Monitoring of the OD at 580 nm

It has already been shown that from a phylogenetic point of view, the strain L-3 and *Archaeoglobus fulgidus* (DSM 4304) exhibit 99% similarity between the DNA sequences coding for the corresponding 16S RNA. The DNA/DNA hybridization exhibited homology close to 90%. Therefore, the strain L-3 belongs to the genus *Archaeoglobus* and is close to the species *A. fulgidus*.

The monitoring of the growth of *Archaeoglobus fulgidus* and the strain L-3 shows a short latency phase, followed by an exponential phase and a stationary phase.

According to the curves, a short latency phase is noted corresponding to a restoration of the physiological functions of these two strains, and adaptation to the conditions of the culture medium. For *Archaeoglobus fulgidus* and for the strain L-3, the latency phase lasts between 1 and 2 days. As regards the exponential phase, it lasts almost 11 days for *Archaeoglobus fulgidus*, whereas for the strain L-3, this phase lasts only a week.

Comparing the two archaeobacteria, and on the basis of the cell growth (expressed in OD at 580 nm), *Archaeoglobus fulgidus* shows a cell growth much greater than the strain L-3. *Archaeoglobus fulgidus* reaches 0.89 OD unit in contrast to strain L-3 which scarcely reaches 0.26 OD unit. This can be explained by the fact that *Archaeoglobus fulgidus* is found in optimum conditions for its growth, i.e. the culture medium corresponds to the nutritional requirements of this Archaea, and not of L-3

To conclude, *Archaeoglobus fulgidus* shows much higher cell biomass values than the strain L-3.

I.4.2. Degradation Kinetics of Lactate for the Strain L-3 and *Archaeoglobus fulgidus*

In the preceding operations, we showed that the metabolism of degradation of the lactate with *A. fulgidus* is characterized by a formation of traces of acetate. On the other hand, for the strain L-3, the mineralization leads to $CO_2$.

The development of the lactate concentration, for the two strains, was monitored over a period of approximately 3 months. The lactate concentration drops rapidly during the first 15 days due to effective consumption of the lactate during the exponential growth phase. Subsequently the lactate concentration continues to fall but more slowly. For *Archaeoglobus fulgidus*, at the end of three months, all of the lactate is degraded, in contrast to the strain L-3. This can be explained by the fact that the strain L-3 can have a substrate degradation metabolism different from that of *Archaeoglobus fulgidus*.

II. The Heavy Hydrocarbons

The behaviour of *Archaeoglobus fulgidus* and of the strain L-3 was studied in the presence of hydrocarbons as sole source of carbon and energy.

This study comprises two major sections, a qualitative study of the hydrocarbon degradation abilities of the two Archaea, and a quantitative study of any degradation of hydrocarbons.

II.1. Qualitative Study

II.1.1. Screening for Hydrocarbon Degradation

The study of the hydrocarbon degradation abilities is an experiment which requires a particularly long incubation. Thus, it was carried out in Bellco tubes sealed with thick rubber stoppers.

For these experiments, tubes containing 10 ml of culture medium without substrate, are 10% inoculated, then the hydrocarbon is introduced by injection through the stopper.

The hydrocarbons chosen are model molecules belonging to the different classes of hydrocarbons, namely:

hexadecane ($CH_3(CH_2)_{14}CH_3$, C16), a saturated linear aliphatic hydrocarbon;

hexadecene ($CH_3(CH_2)_{13}CHCH_2$, C16:1), an unsaturated linear aliphatic hydrocarbon of biogenic origin;

dibenzothiophene (DBT, $C_{12}H_8S$), a sulphur-containing aromatic hydrocarbon.

The aliphatic hydrocarbons (C16; C16:1) are added to the corresponding tubes, at a rate of 0.04 ml/10 ml of culture medium. The aromatic hydrocarbons (DBT) are solubilized in 2,2,4,4,6,8,8-heptamethylnonane (HMN, $C_{16}H_{34}$) at a rate of 20 mg/ml of HMN, and 0.75 ml of this solution is injected into 10 ml of culture medium.

The aromatic hydrocarbons were solubilized in the heptamethylnonane (HMN), a branched saturated aliphatic hydrocarbon, due to the toxicity of these aromatic hydrocarbons (Rabus et al., 1993).

3 tubes were produced for each test and control. The growth of the strains was monitored indirectly by the production of sulphide. Table 1 shows the results of the development of the sulphides.

For the two strains, the production of sulphide is rapid for the positive controls where the substrate is lactate; in fact, within the space of 9 days, the sulphide concentration at least tripled. The values obtained are sometimes unstable as a function of time; this can be explained, on the one hand by the oxidation of the sulphides produced following an involuntary introduction of $O_2$ during samplings and on the other hand by the limited precision of the turbidimetric sulphide assay method.

For a series of negative controls constituted by tests where no substrate was added (control without substrate), the sulphide production does not exceed 0.8 mM throughout the whole duration of the experiment, i-or the two strains. These controls without substrate make it possible to quantify the sulphide produced by the degradation of the traces of lactate originating from the inoculum and/or by a possible mineralization of the yeast extract contained in the culture medium.

For the second series of controls, controls where in the test only the solvent of the aromatic hydrocarbons, i.e. HMN was introduced (HMN control), sulphide productions greater than those of the preceding controls (controls without substrate) were generally obtained.

As regards the tests carried out in the presence of aliphatic hydrocarbons (Test C16; Test C16:1) the sulphide production proves to be very low for alkane; in fact, the latter does not exceed 0.8 mM, for the two strains. On the contrary, for alkene (C16:1), approximately 3 mM of sulphide are produced.

As regards the tests with the polycyclic aromatic hydrocarbons and in particular phenanthrene, the sulphide production is very low, not exceeding 0.5 mM, and is even less than that of the controls without substrate. By contrast, in the case of naphthalene, the sulphide production is greater than those produced in the controls without substrate, in the tests containing phenanthrene, and hexadecane (C16). On the other hand, in general, it does not reach that of the control containing the solvent, HMN.

As regards the tests containing the sulphur-containing aromatic hydrocarbon, DBT, solubilized in HMN, there is significant production of sulphide compared with the other tests containing the different polycyclic linear or aromatic aliphatic hydrocarbons, for the two strains. Moreover, the sulphide production in the tests with DBT is in general much greater than that of the controls containing HMN only.

At this stage of the experiment, based on the production of sulphide by the two strains, the hypothesis of a possible degradation of the saturated linear aliphatic hydrocarbons (C16), and of that of the polycyclic aromatic hydrocarbon, phenanthrene is set aside. By contrast, in the case of the alkenes, HMN, the solvent used, DBT, and of naphthalene, the results obtained make it possible to put forward the hypothesis of an oxidation of these hydrocarbons. This hypothesis, based on a sulphide assay, remains to be confirmed, firstly, by a subculture of these tests on these same hydrocarbons.

TABLE 1

Monitoring of sulphide production according to the Cord-Ruwish technique, for cultures of *Archaeoglobus fulgidus* and the strain L-3

| | | | | A. fulgidus | | | | | Strain L-3 | | | | |
|---|---|---|---|---|---|---|---|---|---|---|---|---|---|
| | OD 480 | | 0 d | 10 d | 45 d | 60 d | 70 d | ΔS tf-ti | 0 d | 10 d | 45 d | 60 d | 70 d | ΔS tf-ti |
| Control | Lactate | 1 | 0.3 | 4 | 3.5 | 3.3 | 3.9 | 3.6 | 0.3 | 4.1 | 1.8 | 2.5 | 4.7 | 4.4 |
| | | 2 | 0.5 | 5.8 | 3.8 | 3 | 3.7 | 3.2 | 0.2 | 2.9 | 3.2 | 3.1 | 4.3 | 4.1 |
| | | 3 | 0.5 | 8.6 | 4.3 | 3.1 | 3.7 | 3.2 | 0.6 | 1.6 | 1.7 | 1.3 | 1.4 | 1.4 |
| Test | C16 | 1 | 0.7 | 0.1 | 0.6 | 0.6 | 1 | 0.3 | 0.6 | 1.4 | 0.4 | 0.7 | 0.7 | 0.1 |
| | | 2 | 0.8 | 0.3 | 0.4 | 0.5 | 0.5 | −0.3 | 0.5 | 0.8 | 0.9 | 0.8 | 1.3 | 0.8 |
| | | 3 | 0.9 | 0.1 | 1.3 | 1.2 | 0.8 | −0.1 | 0.9 | 0.4 | 0.4 | 0.2 | 0.6 | −0.3 |
| Test | C16:1 | 1 | 0.8 | 2.8 | 3.6 | ND | ND | 2.8 | ND | ND | ND | ND | ND | ND |
| | | 2 | 0.6 | 2.1 | 3.6 | ND | ND | 3.0 | ND | ND | ND | ND | ND | ND |
| | | 3 | 0.8 | 1.2 | 4.3 | ND | ND | 3.5 | ND | ND | ND | ND | ND | ND |
| Test | Naphthalene | 1 | 0.8 | 0.4 | 0.8 | 0.7 | 1.3 | 0.5 | 0.8 | 0.4 | 0.9 | 0.6 | 1.7 | 0.9 |
| | | 2 | 0.8 | 0.6 | 1.1 | 1.2 | 1.7 | 0.9 | 0.6 | 0.3 | 1 | 0.5 | 1.3 | 0.7 |
| | | 3 | 0.8 | 0.8 | 1.4 | 0.7 | 1.3 | 0.5 | 0.8 | 0.6 | 0.8 | 0.5 | 1.1 | 0.3 |
| Test | Phenanthrene | 1 | | 1.1 | 1.6 | 0.8 | 1.5 | 0.4 | | 0.4 | 0.5 | 0.4 | 0.5 | 0.1 |
| | | 2 | | 0.8 | 0.9 | 0.5 | 0.9 | 0.1 | | 0.9 | 1 | 0.5 | 0.6 | −0.3 |
| | | 3 | | 1.4 | 0.6 | 0.5 | 0.6 | −0.8 | | 0.3 | 0.8 | 0.3 | 0.8 | 0.5 |
| Test | DBT | 1 | 0.4 | 0.6 | 1.1 | 1.1 | 1.4 | 1 | 0.1 | 1.3 | 1 | 0.6 | 0.9 | 0.8 |
| | | 2 | 0.3 | 0.8 | 1.3 | 1.7 | 3 | 2.7 | 0 | 0.2 | 1.2 | 0.7 | 1.2 | 1.2 |
| | | 3 | 0.5 | 0.7 | 1.3 | 1.5 | 2.2 | 1.7 | −0.1 | 0.7 | 1.4 | 1.1 | 1.4 | 1.5 |
| Control | HMN | 1 | 0.4 | 0.8 | 0.8 | 0.9 | 1.3 | 0.9 | 0 | 0.9 | 0.7 | 0.6 | 1 | 1 |
| | | 2 | 1.1 | 0.8 | 1.1 | 0.7 | 0.9 | −0.2 | 0 | 0.2 | 0.9 | 0.8 | 1.4 | 1.4 |
| | | 3 | 0.3 | 1 | 1.1 | 1.3 | 1.2 | 0.9 | −0.1 | 0.4 | 0.9 | 1.3 | 1.9 | 2 |
| Control without substrate | | 1 | 0.6 | | 0.8 | 0.7 | 0.8 | 0.2 | −0.1 | | 0.5 | 0.4 | 0.7 | 0.8 |
| | | 2 | 0.4 | | 1 | 0.8 | 1 | 0.6 | −0.1 | | 0.5 | 0.2 | 0.7 | 0.8 |
| | | 3 | 0.7 | | 0.7 | 1.2 | 1.1 | 0.4 | −0.1 | | 0.7 | 0.2 | 0.7 | 0.8 |

II.1.2. Confirmation of the Results by Subculture

A subculture was carried out starting from the preceding experiment on naphthalene, DBT solubilized as previously in HMN, and on HMN alone, for the two strains studied. The tubes constituting the inoculum were selected from the 3 tubes of the preceding experiment on the basis of the following criteria: a sulphide assay according to Cord-Ruwish, a determination of the cell biomass at 580 nm confirmed by a cell count, and microscope observations revealing the state of the cells (Table 2).

TABLE 2

Choice of the inoculum for the subculture

| | | A. fulgidus | | | | strain L-3 | | | |
|---|---|---|---|---|---|---|---|---|---|
| | | $H_2S$ (mM) | OD 580 | Count (Cells/ml) | State of the cells | $H_2S$ (mM) | OD 580 | Count (Cells/ml) | State of the cells |
| DBT | 1 | 1.4 | 1.424 | $8.33*10^7$ | "++" | 0.9 | 0.2284 | $8.17*10^7$ | "+" |
| | 2 | 3.2 | 0.9189 | $7.22*10^7$ | "++" | 1.2 | 0.3479 | $6.55*10^7$ | "+" |
| | 3 | 2.2 | 0.9801 | $9.4*10^7$ | "++" | 1.4 | 0.5760 | $7.94*10^7$ | |
| HMN | 1 | 1.3 | nd | $6.1*10^7$ | "++" | 1 | 0.5921 | nd | "+" |
| | 2 | 0.9 | nd | $2.27*10^7$ | "–" | 1.4 | 0.6696 | $6.08*10^7$ | "+" |
| | 3 | 1.2 | nd | $6.6*10^7$ | "+" | 2 | 0.9670 | $6.41*10^7$ | |
| Naphthalene | 1 | 1.3 | 0.1267 | nd | "–" | 1.7 | 0.627 | nd | |
| | 2 | 1.7 | 0.7136 | nd | "+" | 1.3 | 0.8256 | nd | "+" |
| | 3 | 1.3 | 0.73 | nd | "+" | 1.1 | 0.3381 | nd | "+" |

"++": Cells in very good state; isolated or in pairs.
"+": Cells in good state.
"–": The majority of the cells have reached the lysis stage.
nd: not determined The tubes having the highest hydrogen sulphide values also have bacterial cells in large numbers and in a good state and have therefore been chosen (highlighted cells in the table correspond to the tubes chosen for the subculture).

Tables 3 and 4 show the results of the development of sulphide production following the subculture.

For this subculture, apart from the tests containing the hydrocarbon (DBT, naphthalene (Naph), LIMN), and seeded with the previously chosen inoculum, abiotic controls (negative controls) containing the substrate (hydrocarbon) but not inoculated were produced for the purpose of quantifying the sulphide production which could be due to chemical reactions between the different constituents of the medium. In these controls there was no development in the concentration of sulphide over a period of 20 days (Table 4).

TABLE 4

Monitoring of sulphide production in the negative controls (without inoculum) of the subcultures shown in Table 3

| | OD 480 | 0 d | 20 d |
|---|---|---|---|
| Control (−) | DBT 1 | 0.3 | 0.3 |
| | DBT 2 | 0.4 | 0.3 |
| Control (−) | HMN 1 | 0.5 | 0.4 |
| | HMN 2 | 0.5 | 0.5 |
| Control (−) | Naph 1 | 0.5 | 0.2 |
| | Naph 2 | 0.4 | 0.2 |

For *Archaeoglobus fulgidus*, the growth on the different hydrocarbons tested is confirmed. In fact, the rate of sulphide production is significant for the tests containing the hydrocarbons, DBT, naphthalene and HMN. Within the space of 45

TABLE 3

Monitoring of sulphide production according to the Cord-Ruwish technique, for the cultures of A. fulgidus and of the strain L-3, for the subculture

| | | A. fulgidus | | | | | L-3 | | | | |
|---|---|---|---|---|---|---|---|---|---|---|---|
| | OD 480 | 0 d | 8 d | 22 d | 45 d | ΔS tf-ti | 0 d | 8 d | 22 d | 45 d | ΔS tf-ti |
| Control (+) | Lactate 1 | 0.5 | 0.3 | 0.3 | 0.2 | −0.3 | 0.2 | 4.8 | 4.7 | 3.9 | 3.7 |
| | 2 | 0.2 | 0.3 | 0.3 | 0.3 | 0.1 | 0.1 | 6.1 | 8 | 10.6 | 10.5 |
| Test | Naph 1 | 0.2 | 0.5 | 1.5 | 0.8 | 0.6 | 0.3 | 0.6 | 0.8 | 1.3 | 1 |
| | Naph 2 | 0.2 | 0.8 | 1.4 | 2.2 | 2 | 0.2 | 0.5 | 0.9 | 0.9 | 0.7 |
| | Naph 3 | 0.2 | 0.4 | 0.5 | 1.6 | 1.4 | 0.2 | 0.4 | 0.5 | 0.7 | 0.5 |
| Test | DBT 1 | 0.2 | 1.3 | 2.1 | 3.2 | 3 | 0.3 | 0.6 | 1.1 | 2 | 1.7 |
| | DBT 2 | 0.2 | 1.1 | 1.9 | 3.3 | 3.1 | 0.2 | 0.6 | 1 | 1.1 | 0.9 |
| | DBT 3 | 0.1 | 1.2 | 1.9 | 3.3 | 3.2 | 0.3 | 0.4 | 0.8 | 1 | 0.7 |
| Test | HMN 1 | nd | 0.6 | 1.2 | 2 | 1.4 | 0.3 | 0.6 | 1 | 1.5 | 1.2 |
| | HMN 2 | nd | 1 | 2 | 3.5 | 2.5 | 0.2 | 0.5 | 0.9 | 1.2 | 1 |
| | HMN 3 | nd | 0.7 | 0.8 | 2.2 | 1.5 | 0.2 | 0.4 | 0.6 | 0.7 | 0.5 | days, the sulphide value measured in the tests where the substrate is DBT, exceeded 3 mM (Table 3), whereas in the hydrocarbon screening stage, the sulphide value for these same tests and over the same period of time did not exceed 1 mM ($\Delta S_{45d}$, Table 1). Therefore, the sulphide production tripled over the same period (45 days).

As regards HMN, which during the screening stage was used as a control, the sulphide production during the subculture reached 1.8 mM on average, thus, compared with the first experiment, the sulphide production on average tripled or even more, and was also more rapid.

Generally, the sulphide productions are more rapid during the subculture compared with the first experiment. Thus, the strain appears to adapt to the hydrocarbons as a source of carbon and energy.

Comparing the tests where the substrate is DBT, solubilized in HMN, relative to the tests containing only the solvent HMN, the sulphide production in the presence of DBT is greater than that obtained in the absence of DBT (Table 3).

Therefore, in these experiments, the sulphide production appears to be linked to the degradation of the HMN. Moreover, the difference in sulphide production between the two preceding types of tests (tests with HMN, tests with DBT solubilized in HMN) makes it possible to envisage a degradation of the DBT.

The saturated and branched aliphatic hydrocarbons were for a long time considered as molecules resistant to degradation in the absence of oxygen. In fact, according to the literature, only two works demonstrate the anaerobic degradation of pristane, a saturated and branched linear aliphatic hydrocarbon as with HMN, under conditions of denitrification (Bregnard et al., 1997) or methanogenesis (Grossi et al., 2000).

The sulphide productions in the presence of naphthalene, solubilized in HMN, being lower that those obtained with HMN alone, the degradation of naphthalene appears improbable. The remainder of the work focussed on DBT and HMN.

For the strain L-3, a sulphide production on DBT, naphthalene and HMN is also obtained, however for this strain, the phenomenon was not accelerated following subculture (Tables 1 and 3).

II.2. Quantitative Study of the Degradation of Hydrocarbons (DBT, HMN)

Experiments were carried out in order to establish the stoichiometric equation of the degradation of hydrocarbons in the case of the collection strain only. Thus, the hydrocarbon concentrations were assayed at the initial and final time, like the thiosulphate concentrations. Moreover, the increase in the biomass was followed by the increase in the microbial population based on the most probable number method (MPN).

In order to be able to quantify the hydrocarbons with precision, the thick rubber stoppers were covered with a Teflon film, an inert substance which avoids any loss of the hydrocarbon by absorption or adsorption.

The hydrocarbons were added at a rate of:
for the DBT: 10 mg of DBT dissolved in 0.5 ml of HMN, 0.5 ml of this solution is added to the tests;
for the HMN: 6 µl of HMN/10 ml of culture medium.

The tests prepared are inoculated with the preceding subculture.

The results obtained are shown in the table.
A few results:
After 7 weeks of incubation:

|  | Sulphide (mM)(480 nM) | Cell density |
|---|---|---|
| T– without HMN with only yeast extract (test 1) | 0.6 mM | + |
| E with HMN, + EL (test 2) | 1.3 | ++ |
| T– without DBT/HMN, with only EL (test 3) | 0.5 | + |
| E with DBT/HMN, + EL (test 4) | 1.8 | +++ |

Part of the experiment which shows the absence of growth on yeast extract. The productions of biomass as of sulphide are linked to the presence of the hydrocarbons.

Following the experiment: for the sulphide assay the following were finally obtained at the end of 75 days:
T: 0.5 mM (tests 1.3)
HMN: approximately 6 mM (test 2)
DBT: approximately 9.5 mM (test 4)

II.3. Complementary Hydrocarbon (DBT, HMN) Degradation Experiments

Complementary hydrocarbon degradation experiments were carried out, with the purpose of characterizing this degradation.

A first experiment was carried out with *A. fulgidus* for the purpose of studying the effect of sulphate as an electron acceptor instead of the thiosulphate used previously. In the tests carried out, in the presence of hydrocarbon (DBT, HMN) and sulphate, there was no microbial growth. This explains that at the bottom of the oceans where sulphate is abundant relative to thiosulphate which is in the minority, the phenomenon of DBT or HMN degradation cannot occur spontaneously.

Another experiment was carried out for the purpose of confirming the absence of none branched and saturated linear aliphatic hydrocarbon degradation ability of *A. fulgidus*, thus, tests containing thiosulphate and a mixture of undecane (C11) and tetradecane (C14) linear aliphatic hydrocarbons, and inoculated with the inoculum originating from the subculture the substrate of which is HMN, were prepared. The mixture of aliphatic hydrocarbons was added to the tests at a rate of 4 µl of C11 and 4 µl of C14 in 10 ml of culture medium. A thiosulphate assay was carried out at the initial time and at the final time.

The invention claimed is:

1. A process for the degradation, under anaerobic conditions, of saturated or unsaturated, linear or branched, aliphatic or aromatic hydrocarbons, said hydrocarbons optionally containing sulphur, the process comprising:
    placing said hydrocarbons in the presence of thermophilic sulphate-reducing archaeobacteria in a reaction medium,
    adding at least one of sulphate or thiosulphate to the reaction medium, and
    utilizing said sulphate or thiosulphate, as an electron acceptor, and utilizing said hydrocarbons as electron donors,
    wherein the archaeobacteria are at least one of *Archaeoglobus fulgidus* CNCM I-3465 and *Archaeoglobus fulgidus* CNCM I-3469.

2. The process according to claim 1, wherein the hydrocarbons are selected from the group consisting of: branched alkanes having a linear chain of 5 to 20 carbon atoms, linear alkenes having a chain of 1 to 20 carbon atoms, and aromatic compounds.

3. The process according to claim 2, wherein the hydrocarbons are selected from the group consisting of: heptamethylnonane (HMN), prystane, linear alkenes having a chain of 1 to 16 carbon atoms, dibenzothiophene (DBT), benzene, toluene, naphthalene and phenanthrene.

4. The process according to claim 1, wherein in the presence of hydrocarbons the process produces hydrogen sulphide ($H_2S$) in the reaction mixture at a concentration that is greater than or equal to 1 mM.

5. The process according to claim 4, wherein in the presence of hydrocarbons the process produces $H_2S$ in the reaction mixture at a concentration that is greater than or equal to 4 mM.

6. The process according to claim 1, wherein the archaeobacteria is present in the reaction mixture in an amount of 1 g/L (wet weight) for 2 mM of hydrocarbons.

7. The process according to claim 1, wherein the archaeobacteria are in the presence of the hydrocarbons in the reaction medium for a time period of about 15 days.

8. The process according to claim 1, further comprising: recovering the archaeobacteria from the reaction mixture.

9. The process according to claim 1, comprising adding thiosulphate to the reaction medium.

10. The process according to claim 8, further comprising purifying membrane lipids from the recovered archaeobacteria.

11. The process according to claim 1, wherein the reaction medium comprises thiosulphate or sulphate at a concentration of 20 mM.

12. A process for degrading hydrocarbons, comprising:
placing said hydrocarbons in a reaction medium in the presence of at least one of *Archaeoglobus fulgidus* CNCM I-3465 and *Archaeoglobus fulgidus* CNCM I-3469; and
culturing the *Archaeoglobus fulgidus* in the reaction medium under anaerobic conditions at a temperature between 55° C. to 85° C.,
wherein the reaction medium comprises thiosulphate, and the thiosulphate is utilized as an electron acceptor and the hydrocarbons are utilized as electron donors.

13. The method according to claim 12, comprising culturing the reaction medium under anaerobic conditions at a temperature of about 75° C.

14. Biologically pure archaeobacteria selected from the following species:
*Archaeoglobus fulgidus* CNCM I-3465 (strain L3), and
*Archaeoglobus fulgidus* CNCM I-3469 (strain L4).

* * * * *

UNITED STATES PATENT AND TRADEMARK OFFICE
CERTIFICATE OF CORRECTION

PATENT NO. : 8,455,240 B2  Page 1 of 1
APPLICATION NO. : 11/993971
DATED : June 4, 2013
INVENTOR(S) : Fardeau et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1278 days.

Signed and Sealed this
Eighth Day of September, 2015

Michelle K. Lee
*Director of the United States Patent and Trademark Office*